March 13, 1945.   J. E. SOCKE ET AL   2,371,194
CONTAINER
Filed Jan. 19, 1943   3 Sheets-Sheet 1

INVENTORS
John E. Socke
George E. Eckman
BY
Charles H. Erne
ATTORNEYS

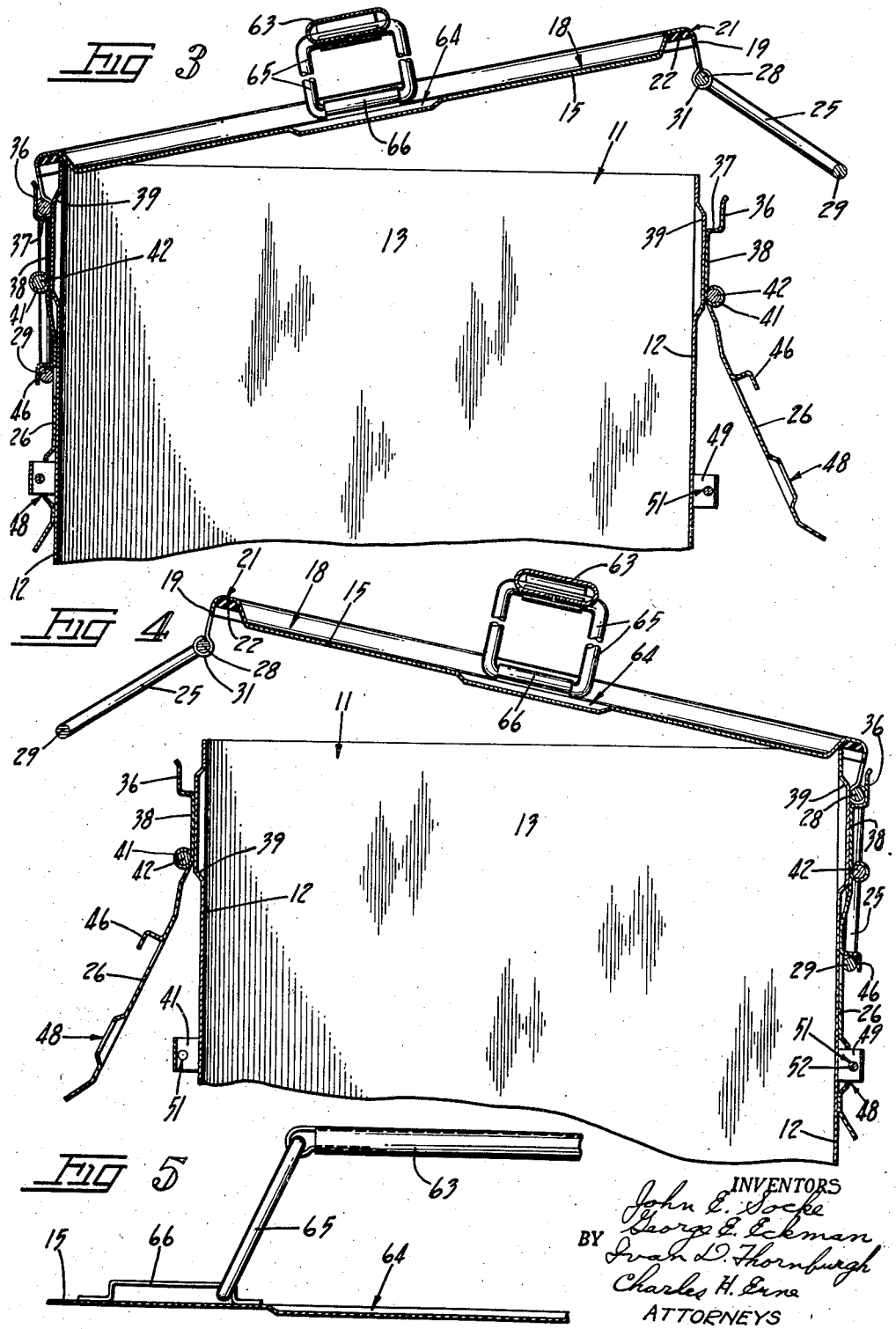

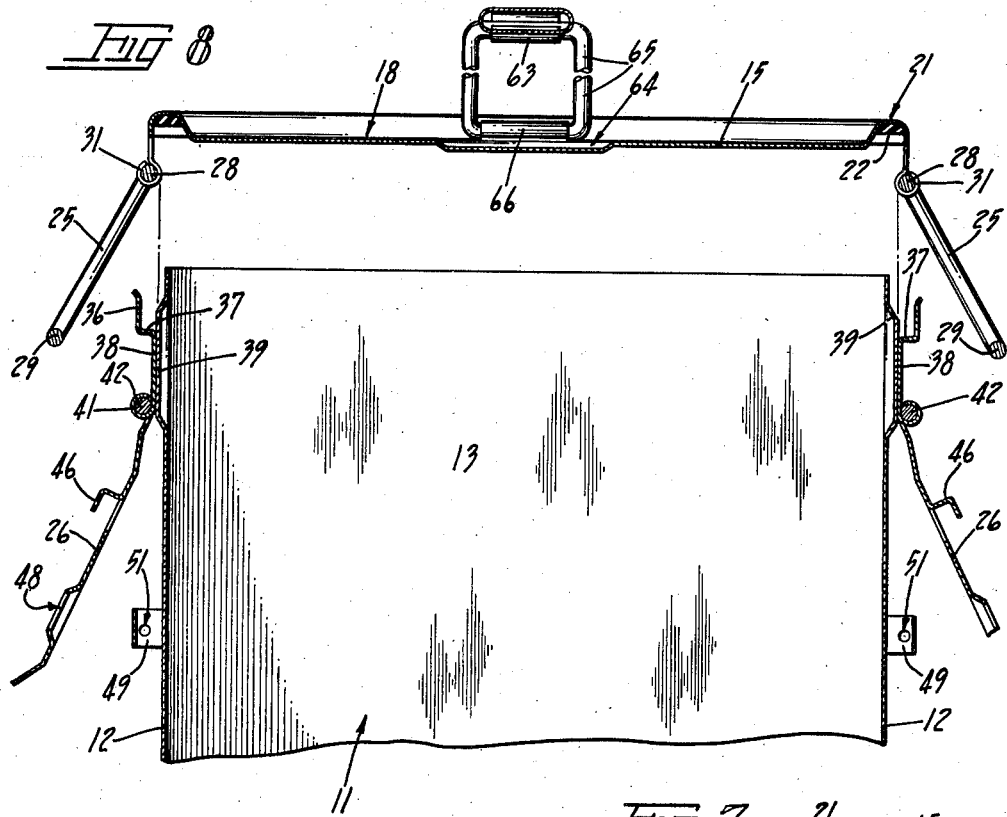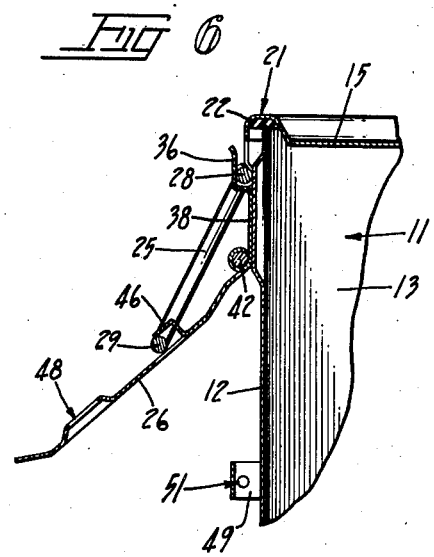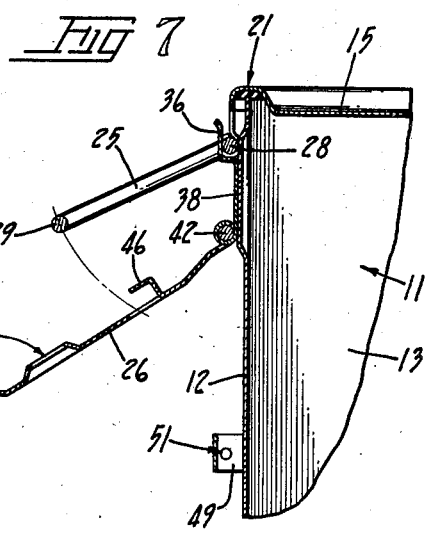

Patented Mar. 13, 1945

2,371,194

UNITED STATES PATENT OFFICE 2,371,194

CONTAINER

John E. Socke, Pelham Manor, N. Y., and George E. Eckman, New Milford, N. J., assignors to American Can Company, New York, N. Y., a corporation of New Jersey Application January 19, 1943, Serial No. 472,886

4 Claims. (Cl. 220—31)

The present invention relates to containers and has particular reference to hinge devices for hingedly securing container covers to container bodies for hingedly opening said containers or permitting complete separation of the cover from the container body, as desired, and which devices provide other novel functions and advantages.

An object of the invention is the provision of a complementary hinge construction for a container and its cover wherein the cover may be clamped tightly and uniformly in place on the container during shipment and storage and may be hinged open from two different sides of the container or may be entirely removed free of the container as desired.

Another object is the provision of such a container and cover hinge construction which will enable quick and easy opening of the container by way of hinging the cover open from either of two sides or by entirely removing it from the container thereby being especially adapted for emergency uses such as military field operations.

A further object of the invention is the provision of a comparatively simple hinge construction which not only provides a novel and effective hinge connection between a container and a gasket lined cover but which also functions as a protective stop device, preventing injury to the cover gasket when the cover carries the weight of a number of filled containers piled on top of each other.

Still another object of the invention is the provision of complementary hinge devices in a container and gasket lined cover which cooperate in clamping the cover gasket between the container top and the cover flange in a uniform manner and on an even plane, thereby effecting a tight annular seal between container body and cover for the protection of the contents.

Yet another advantage of the invention resides in the said protective stop devices performing the additional function of guiding the cover into proper assembly alignment with the container body.

Numerous other objects and advantages of the invention will be apparent as it is better understood from the following description, which, taken in connection with the accompanying drawings, discloses a preferred embodiment thereof.

Referring to the drawings:

Figs. 3 and 4 are views similar to Fig. 2 illustrating the upper portion of the container and showing the different hinging positions of the container cover, with portions of the cover handle broken away;

Fig. 5 is an enlarged fragmentary sectional view of the cover handle;

Figure 1:
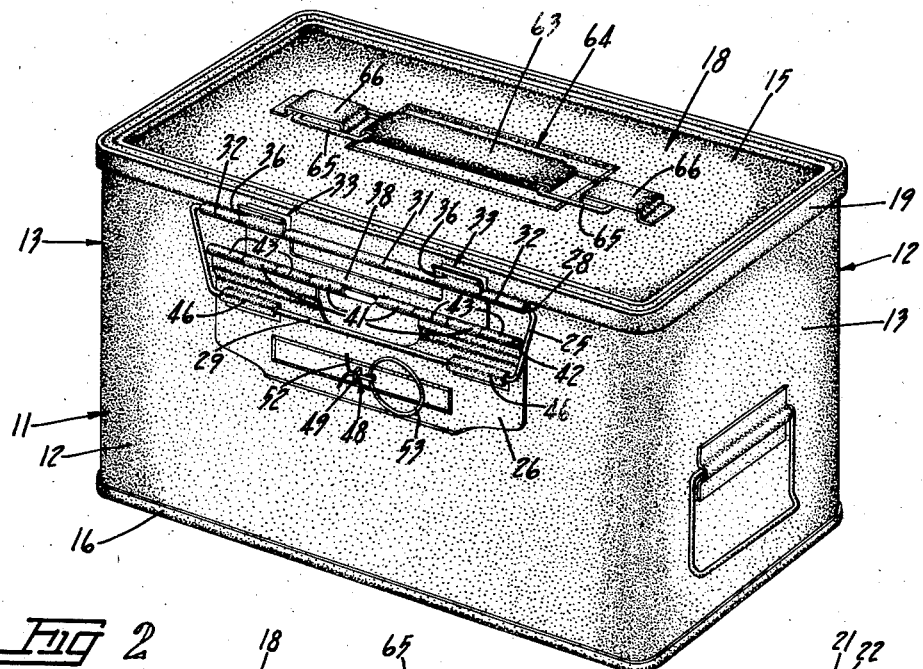
Figure 1 is a perspective view of a container with its cover in closed position and embodying the instant invention.

Figs. 6 and 7 are enlarged fragmentary sectional views of the container and cover showing different cover releasing positions of devices for holding the cover in place on the container; and Fig. 8 is an enlarged composite view similar to Figs. 3 and 4 showing how the cover may be entirely freed from the container and illustrating the cover in spaced relation thereto after such a removal, with portions of the cover handle broken away.

As a preferred embodiment of the invention the drawings illustrate a sheet metal container which is particularly adapted for use as a machine gun ammunition case, although the invention is equally well adapted to many other kinds of containers. The container includes a rectangular body 11 (Figs. 1 and 2) having two side walls 12, two end walls 13, a permanent bottom 14, and a removable cover 15. The bottom is secured to the body in any suitable manner such as, for example, by a conventional double seam 16.

The cover 15 is formed with a countersunk panel 18 and a peripheral depending flange 19 which sets off an inverted channel 21 (see also Figs. 3 and 4). This channel preferably retains a resilient annular gasket 22 of rubber or the like material. The gasket extends entirely around the peripheral channel of the cover and engages the upper edge of the body 11 and thus seals the container when the cover is clamped in place on the body.

The cover 15 is retained on the body in clamped position by complementary hinge devices which include a pair of link members 25 and a pair of latch or lever members 26. There is one of these members on each side wall 12 when the container is closed by the cover 15. The links 25 are preferably made of heavy wire and are substantially rectangular in shape, having an upper bar or rung 28 and a lower rung 29. The upper rung of the link serves as a hinge pintle for the cover and is retained in place on the cover by a plurality of hinge knuckles which are formed on each of the two opposing longitudinal flanges 19 of the cover. These hinge knuckles surround the enclosed parts of the pintle.

The drawings show three such hinge knuckles in each hinge, a long central knuckle 31 and two short outer knuckles 32. Each outer knuckle is spaced from each side of the central knuckle leaving two portions of the pintle 28 exposed between the knuckles. These exposed portions of the pintle span openings 33 which are cut in the depending flange 19 of the cover.

When the cover 15 is in place on the container body 11 the exposed portions of each pintle 28 rest in a pair of spaced, channel shaped, parallel open top hinge and stop lugs 36 located adjacent the upper edge of the body and having a stop shoulder 37. These lugs are upper extensions of a lug plate 38 secured to each side wall 12 of the body above the latch 26 in any suitable manner, preferably by being welded to bosses 39 formed on the body.

The lower edge of each lug plate 38 is formed with spaced and aligned hinge knuckles 41 which carry a straight wire pintle 42. Hinge knuckles 43 also enclose the pintle and provide a hinge with the plate knuckles 41. The knuckles 43 are formed on the upper edges of the latch members 26. In this manner the two latch members 26 are hingedly carried on the two side walls 12 of the container body.

Figure 2:
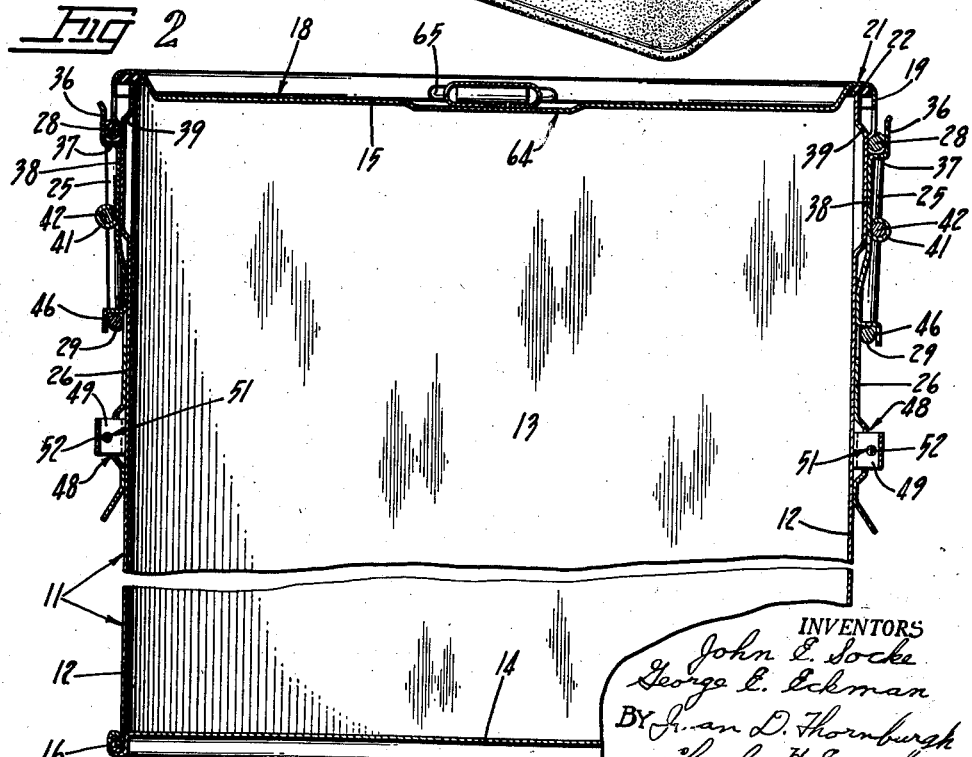
Fig. 2 is an enlarged transverse sectional view taken through the container and cover shown in Fig. 1, with portions broken away.

Each latch member 26 is a long narrow plate which normally, i. e. in latched position, lies flat against the side wall 12 of the body. This plate is formed with a pair of spaced, parallel, channel shaped, depending latch lugs 46 open at the bottom, preferably cut from the material of the latch member 26. These lugs 46 engage over the lower long side or rung 29 of the wire links 25 when the plate is in latched position, as best shown in Figs. 1 and 2. Adjacent the lower edge, each latch member is formed with a vertical slot 48.

The slots 48 receive locking lugs 49 which extend out from the side walls 12 of the container body and when the latches 26 are in latched position, they project through the slots in the latch members. The locking lugs may be formed with small holes 51 which are so positioned as to be just beyond the latch members when the latter are latched and a cotter pin 52 having a pull ring 53 secured in its head may be inserted in the hole 51. These cotter pins hold the latch members in a locked position against the sides of the body as best shown in Fig. 1.

In such a construction of hinge device, the hingeable latch members 26 while locked in position by the cotter pins 52 against the side walls 12 of the container body 11 retain the hingeable links 25 in a taut position also against the side walls of the body while the upper and lower rungs of the links are confined within the body lugs 36 and the latch lugs 46 respectively. While the links and the latch members are in this rigid or locked position, the cover 15 is clamped down tightly on the container body, with the annular gasket 22 of the cover making uniform pressure contact with the whole periphery of the body edge.

With the cover 15 thus firmly secured to the body 11, the contents are effectively protected against air and moisture and other deteriorating influences and the container as a unit may be readily transported and may be easily handled. For this latter purpose the container may be provided with several handles.

A handle 63 is provided on the cover of the container. This handle preferably is substantially flat, formed out of a single piece of sheet metal and is disposed normally in a recess 64 in the countersunk panel 18 of the cover. The looped ends of the handle are connected to rectangular shaped wire links 65 which are loosely engaged in raised elongated clips 66 (see also Fig. 5) secured to the top of the cover. These clips permit of considerable play between the clip and the link so that the handle may be raised to a carrying position, as shown in Fig. 5, or may be depressed to a retracted or non-carrying position as shown in Figs. 1 and 2. This allows containers to be stacked one on top of the other if desired.

The described complementary hinge devices are particularly adapted for rapid and easy opening of the container by a hinging of the cover along either of the two side walls 12 of the body (as seen in Figs. 3 and 4) or by a complete removal of the cover from the body (as shown in Fig. 8). In either of these cases it is merely necessary to remove the cotter pin 52 by a pull on its ring 53. This then may be followed by a swinging, outwardly and upwardly, of the latch member 26, as best shown in Figs. 6 and 7. Swinging action of the latch member automatically shifts the link 25 outwardly and upwardly and thus releases the lower rung 29 of the link from the latch lugs 46 of the latch member. The cover may then be hinged or it may be removed entirely after opening the other latch.

If it is desired to merely hinge the cover open, only one latch member 26 is released. The locked latch member on the opposite side of the body then holds the hinge pintle 28 of the link 25 on this opposite side in place in its hinge lugs 36. This permits the cover to be hinged open on that side while using the hinge pintle as a fulcrum.

With hinge devices on both sides of the container of identical construction and operation, obviously either set of devices may be released as desired to effect a hinging of the cover on the opposite side of the container. Fig. 3 shows such a hinging of the cover on the left side of the body after the hinge device on the right side is released and Fig. 4 shows the same hinging action in reverse, hinging on the right side of the body when the left hinge device is released. Such a double hinging action from two different sides of the container is of great value during emergencies when it is desirable to gain entrance to the contents of the container as rapidly as possible, as for example, when the container is used for cartridges or cartridge belts for machine guns on the battle field.

At times it is advantageous to remove the cover completely from the container. This may be done quickly by raising both latch members 26 simultaneously. This releases both links 25 and permits of lifting the cover 15 free and clear of the container body, as best shown in Fig. 8. Unobstructed access may thereupon be had to the interior of the body. When desired the cover may be replaced on the body and used as a hinged reclosure.

The hinge lugs 36, in addition to their function as hinge knuckles or hinge supports serve the further and important purpose of stops against excessive clamping or depression of the gasket lined cover. This additional function comes into play when a number of containers, filled for example with live ammunition, are stacked on top of each other. The lower containers or boxes in such a pile will bear the brunt of the weight and the top edges of the container bodies might cut through the gaskets 22 if it were not for the shoulders 37 of the lugs 36 acting as stops against excessive downward depression of the cover.

Furthermore the lugs 36 in cooperation with the cut away openings 33 also serve to guide the cover into quick and proper assembly alignment with the container body when the cover is placed or replaced thereon.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

We claim:

1. In a container having a body, a cover for said body, and a pair of hinge pintles disposed one on each of two opposing edges of said cover, the improvement comprising receiving means on said body for said pintles, and pivotally mounted locking means on said body for holding said pintles in said receiving means to retain the cover in position on said body, said locking means constituting cooperating pairs of links and lever members operable independently of each other for selectively releasing said pintles from said receiving means to allow for hingedly opening the cover from one side or the other, said locking means also being operable simultaneously to entirely release said cover so that it may be separated from said body.

2. In a container having a body and a cover for said body, the improvement comprising a pivotally mounted link disposed on each of two opposing edges of said cover, said links each having hinge pintles connecting with said cover, an open lug on said body adjacent each of said pintles for receiving said pintles to allow for hingedly opening the cover from one side or the other and to allow for the separation of the cover from the body, a pivotally mounted latch member hingedly connecting with said body adjacent each of said links, and an open latch lug on said latch members for engaging and holding said links in a locked position, said latch members being hingeable on said body for releasing said links singly to allow for the hinging open of the cover from one side or the other or plurally to allow for the complete removal of the cover from body.

3. In a container having a body and a cover for said body, the improvement comprising a pivotally mounted link disposed on each of two opposing edges of said cover, said links each having hinge pintles connecting with said cover, an open lug on said body adjacent each of said pintles for receiving said pintles to allow for hingedly opening the cover from one side or the other and to allow for the separation of the cover from the body, a pivotally mounted latch member hingedly connecting with said body adjacent each of said links, an open latch lug on said latch members for engaging and holding said links in a locked position, said latch members being hingeable on said body for releasing said links singly to allow for the hinging open of the cover from one side or the other or plurally to allow for the complete removal of the cover from the body, and means for locking said latch members against said body to retain said cover in place on the body.

4. A container comprising in combination, a body, a cover for said body, an annular gasket in said cover, a hinge pintle disposed on each of two opposing edges of said cover, means on said body for receiving and holding both of said pintles to hold the cover in closing position on the container or for selectively holding one of said pintles to hinge said cover on the held side, and stop elements forming a part of said means and providing a stop against which said pintles engage to prevent injury to the cover gasket when external pressure is applied to said cover.

JOHN E. SOCKE.
GEORGE E. ECKMAN.